United States Patent
Miyashita (10) Patent No.: US 12,424,626 B2
(45) Date of Patent: Sep. 23, 2025

(54) COMPOSITE MATERIAL, AND METHOD FOR MANUFACTURING SAME

(71) Applicant: Mitsui Mining & Smelting Co., Ltd., Tokyo (JP)

(72) Inventor: Norihiko Miyashita, Ageo (JP)

(73) Assignee: MITSUI MINING & SMELTING CO., LTD. (JP)

( * ) Notice: Subject to any disclaimer, the term of this patent is extended or adjusted under 35 U.S.C. 154(b) by 0 days.

(21) Appl. No.: 18/291,464

(22) PCT Filed: Feb. 22, 2023

(86) PCT No.: PCT/JP2023/006584
§ 371 (c)(1),
(2) Date: Jan. 23, 2024

(87) PCT Pub. No.: WO2023/163071
PCT Pub. Date: Aug. 31, 2023

(65) Prior Publication Data
US 2025/0105285 A1 Mar. 27, 2025

(30) Foreign Application Priority Data
Feb. 26, 2022 (JP) ................................. 2022-028735

(51) Int. Cl.
*H01M 4/58* (2010.01)

(52) U.S. Cl.
CPC ......... *H01M 4/5815* (2013.01); *H01M 4/582* (2013.01)

(58) Field of Classification Search
CPC .... H01M 4/5815; H01M 4/582; H01M 4/136; H01M 2004/028; H01M 4/36;
(Continued)

(56) References Cited

U.S. PATENT DOCUMENTS

| | | | |
|---|---|---|---|
| 10,020,537 B2 * | 7/2018 | Kanno | H01M 10/0562 |
| 2022/0263122 A1 * | 8/2022 | Nakayama | H01B 1/08 |

FOREIGN PATENT DOCUMENTS

| | | |
|---|---|---|
| CN | 109256555 A | 1/2019 |
| CN | 111082128 A | 4/2020 |

(Continued)

OTHER PUBLICATIONS

International Search Report issued in the corresponding International Patent Application No. PCT/JP2023/006584; mailed on May 16, 2023 (total 5 pages).

(Continued)

*Primary Examiner* — Mark Kopec
*Assistant Examiner* — Jaison P Thomas
(74) *Attorney, Agent, or Firm* — Harness, Dickey & Pierce, P.L.C.

(57) ABSTRACT

A compound A containing Li, S, and M elements (M is phosphorus or the like), and containing a crystal phase with an argyrodite-type crystal structure is prepared, and the compound A and a conductive material are mixed to obtain a composite material in which these materials are composited. The mixing is performed such that an amorphous degree N obtained by $100 \times (I_0 - I_t)/I_0$ is 97% or more, where an intensity of a peak A observed at $2\theta = 29.7° \pm 1.00°$ in an XRD pattern of the compound A is taken as $I_0$, and an intensity of a peak B observed at $2\theta = 29.7° \pm 1.00°$ in an XRD pattern of the composite material is taken as $I_t$. The atomic ratio of a halogen (X) element to the phosphorus (P) element contained in the compound A is preferably less than 1.0.

5 Claims, 5 Drawing Sheets

(58) Field of Classification Search
CPC ...... H01M 4/362; H01M 4/38; H01M 4/5825; H01M 4/624; H01M 4/625; H01M 10/052; H01M 4/58; H01M 4/1397; H01M 4/386; H01M 10/0562; H01M 2300/0068; H01M 10/0525; C01B 25/45; C01B 25/14; C01B 17/20; Y02E 60/10; C01P 2002/72

See application file for complete search history.

(56) References Cited

FOREIGN PATENT DOCUMENTS

| EP | 3502051 A1 | 6/2019 | |
|---|---|---|---|
| JP | 2020-135947 A | 8/2020 | |
| WO | WO-2020214786 A1 * | 10/2020 | ............. C01B 17/22 |
| WO | 2022/045302 A1 | 3/2022 | |

OTHER PUBLICATIONS

Written Opinion of the International Searching Authority issued in the corresponding International Patent Application No. PCT/JP2023/006584; mailed on May 16, 2023 (total 8 pages).
Takashi Hakari, et al., "All-solid-state lithium batteries with Li3PS4 glass as active material"; Journal of Power Sources 293; Year 2015; pp. 721-725 (total 5 pages).

* cited by examiner

COMPOSITE MATERIAL, AND METHOD FOR MANUFACTURING SAME

CROSS REFERENCE TO RELATED APPLICATIONS

This application is a 371 U.S. National Phase of International Application No. PCT/JP2023/006584, filed on Feb. 22, 2023, which claims priority to Japanese Patent Application No. 2022-028735, filed Feb. 26, 2022. The entire disclosures of the above applications are incorporated herein by reference.

BACKGROUND

Technical Field

The present invention relates to a composite material and a method for producing the same. The composite material of the present invention is preferably used as a battery material.

Related Art

Lithium-ion batteries are widely used as power sources for portable electronic devices such as notebook PCs and cell phones because of their high energy density and ease of size and weight reduction. In addition, high-power and high-capacity lithium-ion batteries for use in electric and hybrid electric vehicles have been recently developed.

For example, CN 109256555A has proposed a composite positive electrode material produced by dry ball milling and mixing a sulfide electrolyte of a silver vanadium sulfide crystal structure type and a conductive carbon material. Also, Journal of Power Sources 293 (2015) 721-725 has proposed a positive electrode active material obtained by compositing $Li_3PS_4$ glass, which is a sulfide solid electrolyte, and a carbon-based conductive aid.

The inventor of the present invention conducted investigation in order to improve the performance of lithium-ion batteries. As a result, it was found that a better positive electrode active material is required for the purpose of further improving the performance of lithium-ion batteries.

Therefore, it is an object of the present invention to provide a material capable of enhancing the performance of lithium ion batteries and a preferable method for producing the same.

SUMMARY

The present invention is to solve the above-described problem by providing method for producing a composite material, comprising:

a preparation step of preparing a compound A containing a lithium (Li) element, a sulfur(S) element and an M element and containing a crystal phase with an argyrodite-type crystal structure, wherein M comprises at least one selected from the group consisting of a phosphorus (P) element, a germanium (Ge) element, an antimony (Sb) element, a silicon (Si) element, a tin (Sn) element, an aluminum (Al) element, a titanium (Ti) element, an iron (Fe) element, a nickel (Ni) element, a cobalt (Co) element, and a manganese (Mn) element; and a mixing step of mixing the compou"d A 'nd a conductive material to obtain a composite material in which the compound A and the conductive material are composited;

wherein the mixing step is performed in such a manner that an amorphous degree N obtained by Formula (1) below is 97% or more:

$$\text{Amorphous degree } N(\%) = 100 \times (I_0 - I_t)/I_0 \tag{1}$$

wherein $I_0$ represents an intensity of a peak A which is a diffraction peak observed at a position $2\theta = 29.7° \pm 1.00°$ in an X-ray diffraction pattern obtained when the compound A is measured using an X-ray diffraction device using CuKα1 rays, and $I_t$ represents an intensity of a peak B which is a diffraction peak observed at a position $2\theta = 29.7° \pm 1.00°$ in an X-ray diffraction pattern obtained when the composite material is measured using an X-ray diffraction device using CuKα1 rays.

DETAILED DESCRIPTION

The present invention will be described below based on its preferred embodiment. The present invention relates to a method for producing a composite material. This composite material is a composite material of a compound A and a conductive material described below. The composite material is particularly preferably used as an active material for batteries.

The production method of the present invention is roughly divided into the following steps (1) and (2).
(1) Step of preparing a compound A (hereinafter alternatively referred to as a "preparation step")
(2) Step of mixing the compound A and a conductive material to obtain a composite material in which these materials are composited (hereinafter alternatively referred to as a "mixing step")

Hereinafter, these steps will be described.

Preparation Step

In this step, a compound A is prepared. The compound A preferably contains a lithium (Li) element, a sulfur(S) element, and an M element. The M element is, for example, preferably at least one of a phosphorus (P) element, a germanium (Ge) element, an antimony (Sb) element, a silicon (Si) element, a tin (Sn) element, an aluminum (Al) element, a titanium (Ti) element, an iron (Fe) element, a nickel (Ni) element, a cobalt (Co) element, and a manganese (Mn) element. It is particularly preferable that the M element contains at least a phosphorus (P) element, and more preferable that the M element contains only a P element. This configuration can further increase the discharge capacity of a battery using the composite material obtained by this production method as an active material.

Examples of the compound containing the Li element, the S element, and the M element include compounds containing only the Li element, the S element, and the M element, such as $Li_7PS_6$, $Li_{7+3x}(P^{5+}_{1-x}Fe^{2+}_x)S_6$, and $Li_{7+x}(P^{5+}_{1-x}Si^{4+}_x)S_6$ (where x represents a number of 0.1 to 1.0). Furthermore, the compound containing the Li element, the S element, and the M element may contain other elements in addition to these three types of elements. Examples of the other elements include a halogen (X) element. The use of a compound containing the X element in addition to the Li element, the S element, and the M element can further enhance the properties of the composite material obtained by this production method when used as an active material. The X element may be at least one element selected from fluorine (F), chlorine (Cl), bromine (Br), and iodine (I).

The compound containing the Li element, the S element, the M element, and the X element is preferably represented by Composition Formula (1): $Li_aMS_bX_c$ (where M is at least one element of P, Ge, Sb, Si, Sn, Al, Ti, Fe, Ni, Co, and Mn, and X is at least one element selected from F, Cl, Br, and I) from the viewpoint of further enhancing the properties of the composite material obtained by this production method when used as an active material.

In Composition Formula (1) above, a is preferably 3.0 or more, and more preferably 3.5 or more, from the viewpoint of improving the lithium ion conductivity. Meanwhile, a is preferably 9.0 or less, and more preferably 8.0 or less. In particular, if the M element is P, the atomic ratio of Li to P, that is, the value of a is, for example, preferably 5.0 or more, more preferably 5.5 or more, and even more preferably 6.0 or more. Meanwhile, a is, for example, preferably 8.0 or less, more preferably 7.8 or less, and even more preferably 7.5 or less. If a is within the aforementioned range, the compositing of the compound A and the conductive material can be allowed to progress smoothly.

Furthermore, b is preferably 4.0 or more, more preferably 4.5 or more, and even more preferably 5.0 or more. Meanwhile, b is preferably 7.5 or less, more preferably 7.0 or less, and even more preferably 6.5 or less.

Also, c is preferably 0.1 or more, and more preferably 0.2 or more. Meanwhile, c is preferably less than 1.0, more preferably 0.8 or less, and even more preferably 0.6 or less. If b is within the aforementioned range, the compositing of the compound A and the conductive material can be allowed to progress smoothly, and an amorphous compound A can be preferably obtained. In particular, if the M element is P, the atomic ratio of X to P is preferably within the aforementioned range because the compound A is successfully amorphized.

In particular, the M element in Composition Formula (1) above is preferably at least one of a P element, a Ge element, an Sb element, a Sn element, and a Si element, more preferably contains a P element, and even more preferably contains only a P element. This configuration can increase the discharge capacity of a battery using the composite material obtained by this production method as an active material.

If the M element is P, the value of c, which is the atomic ratio of X to P, is, for example, preferably 0.10 or more, and more preferably 0.2 or more. Meanwhile, the value of c is, for example, preferably less than 1.0, more preferably 0.8 or less, and even more preferably 0.6 or less. If the value of c is within the aforementioned range, the compositing of the compound A and the conductive material can be allowed to progress smoothly, and an amorphous compound A can be preferably obtained. Furthermore, if the M element is P, the atomic ratio of Li to P is, for example, preferably 5.0 or more, more preferably 5.5 or more, and even more preferably 6.0 or more. Meanwhile, the atomic ratio of Li to P is, for example, preferably 9.0 or less, more preferably 8.0 or less, and even more preferably 7.5 or less. If the atomic ratio of Li to P is within the aforementioned range, the compositing of the compound A and the conductive material can be allowed to progress smoothly. If the M element contains P element and other elements, the atomic ratio of Li to P may be, for example, 20.0 or less, 15.0 or less, or 9.0 or less.

The compound A is particularly preferably represented by Composition Formula (2): $Li_{7-d}MS_{6-d}X_d$, from the viewpoint of further enhancing the properties of the composite material obtained by this production method when used as an active material. If the M element is P, the value of d, which is the atomic ratio of X to P, may be similar to the value of c in Composition Formula (1) above, and thus a description thereof has been omitted. Furthermore, if the M element is P, the atomic ratio of Li to P may be similar to that in Composition Formula (1) above, and thus a description thereof has been omitted.

If the M element in Composition Formula (1) above is an M1 element and an M2 element that are different from each other, the compound A can be represented as $Li_a(M1_{1-y}M2_y)S_bX_c$. Furthermore, if the M element in Composition Formula (2) is an M1 element and an M2 element that are different from each other, the compound A can be represented as $Li_{7-d}(M1_{1-y}M2_y)S_{6-d}X_d$. In the formulas, y is preferably 0.010 or more, more preferably 0.020 or more, and even more preferably 0.050 or more. Meanwhile, y is preferably 0.70 or less, and more preferably 0.40 or less, and even more preferably 0.20 or less. The M1 element and the M2 element may be the same as the M elements described in Composition Formula (1), and thus a description thereof has been omitted.

The composition of the elements in the compound A can be determined, for example, using ICP atomic emission spectrometry.

The compound A preferably contains a crystal phase with an argyrodite-type crystal structure, in addition to containing the above-described elements. This configuration can further enhance the properties of the composite material obtained by this production method when used as an active material. The inventor of the present invention conducted research and found that, even in the case in which the compound A contains the above-described elements, if the compound A is amorphous, specifically, if the compound A does not contain a crystal phase with an argyrodite-type crystal structure, the properties of a composite material obtained by compositing the compound A and the conductive material are not likely to be improved even when the composite material is used as an active material of a battery. In particular, the compound A preferably contains a crystal phase with a cubic or orthorhombic argyrodite-type crystal structure. Whether or not a crystal phase with an argyrodite-type crystal structure is contained can be determined by analyzing the active material of the present invention by the X-ray diffraction method or the X-ray total scattering method. CuKα rays, for example, CuKα1 rays can be used as the radiation source in the X-ray diffraction method.

If the compound A has a cubic argyrodite-type crystal structure, it is preferable to have a peak at the positions $2\theta=25.19°\pm1.00°$ and $29.62°\pm1.00°$ in an X-ray diffraction pattern measured using CuKα1 rays.

If the compound A has a cubic argyrodite-type crystal structure, it is more preferable to have a peak at one or at least two positions selected from $2\theta=15.34°\pm1.00°$, $17.74°\pm1.00°$, $30.97°\pm1.00°$, $44.37°\pm1.00°$, $47.22°\pm1.00°$, and $51.70°\pm1.00°$, in addition to the positions $2\theta=25.19°\pm1.00°$ and $29.62°\pm1.00°$, and it is even more preferable to have a peak at all positions of $2\theta=15.34°\pm1.00°$, $17.74°\pm1.00°$, $30.97°\pm1.00°$, $44.37°\pm1.00°$, $47.22°\pm1.00°$, and $51.70°\pm1.00°$, in addition to the positions $2\theta=25.19°\pm1.00°$ and $29.62°\pm1.00°$, in an X-ray diffraction pattern measured using CuKα1 rays.

If the compound A has an orthorhombic argyrodite-type crystal structure, it is preferable to have two peaks at the position $2\theta=25.38°\pm1.00°$ and four peaks at the position $29.77°\pm1.00°$ in an X-ray diffraction pattern measured using CuKα1 rays.

If the compound A has an orthorhombic argyrodite-type crystal structure in an X-ray diffraction pattern measured using CuKα1 rays, it is more preferable to have peaks at one or at least two positions selected from two peaks at $2\theta=15.40°\pm1.00°$, two peaks at $17.86°\pm1.00°$, two peaks at $31.25°\pm1.00°$, four peaks at $44.40°\pm1.00°$, four peaks at $47.20°\pm1.00°$, and two peaks at $52.00°\pm1.00°$, in addition to the two peaks at the position $2\theta=25.38°\pm1.00°$ and the four peaks at the position $29.77°\pm1.00°$, and it is even more preferable to have peaks at all positions of two peaks at $2\theta=15.40°\pm1.00°$, two peaks at $17.86°\pm1.00°$, two peaks at $31.25°\pm1.00°$, four peaks at $44.40°\pm1.00°$, four peaks at $47.20°\pm1.00°$, and two peaks at $52.00°\pm1.00°$, in addition to the two peaks at the position $2\theta=25.38°\pm1.00°$ and the four peaks at the position $29.77°\pm1.00°$.

The positions of the peaks described above are expressed as median±1.00°, but are preferably expressed as median±0.800°, and more preferably expressed as median±0.500°.

The compound A may further contain other materials or other components as necessary. Therefore, the compound A may be constituted by a single phase consisting of a crystal phase with an argyrodite-type crystal structure, or may have other phases in addition to this phase. For example, the compound A may contain a $Li_2S$ phase, a $Li_3PS_4$ phase, a $Li_4P_2S_6$ phase, a LiCl or LiBr phase, or the like, in addition to the crystal phase with an argyrodite-type crystal structure.

In particular, it is preferable that the compound A contains a $Li_2S$ phase in addition to the crystal phase with an argyrodite-type crystal structure, from the viewpoint of further increasing the capacity of the composite material obtained by this production method when used as the active material. It is most preferable that the compound A is mainly constituted by a compound containing the Li element, the S element, the M element, and the X element, and containing a crystal phase with an argyrodite-type crystal structure. In addition to the other materials and other components mentioned above, the compound A may contain incidental impurities to the extent that they have little adverse effect on the effects of the present invention, for example, in an amount of approximately less than 5% by mass, in particular less than 3% by mass.

The compound A is in the form of particles, and its particle size D1 in terms of the volume-based cumulative particle size $D_{50}$ at a cumulative volume of 50 vol % as measured using the laser diffraction scattering particle size distribution method is preferably 0.1 μm or more, more preferably 0.2 μm or more, and even more preferably 0.5 μm or more. Meanwhile, D1 is preferably 20.0 μm or less, more preferably 10.0 μm or less, and even more preferably 5.0 μm or less.

The compound A can be produced using a known method. If the compound A contains, for example, a Li element, a P element, a S element, a Cl element, and a Br element, it is possible to obtain particles of the compound by mixing and firing a lithium sulfide ($Li_2S$) powder, a phosphorus pentasulfide ($P_2S_5$) powder, a lithium chloride (LiCl) powder, and a lithium bromide (LiBr) powder. For example, a ball mill, a bead mill, a homogenizer, or the like is preferably used to mix these powders.

After the powders are mixed as described above, the mixed powder is dried as necessary, fired in an inert atmosphere or while hydrogen sulfide ($H_2S$) gas is circulated, crushed and milled as necessary, and then sieved to obtain the compound A. In the case of performing firing under an atmosphere containing hydrogen sulfide gas, the firing temperature is, for example, preferably 350° C. or higher, and more preferably 450° C. or higher. Meanwhile, the firing temperature is, for example, preferably 650° C. or lower, more preferably 600° C. or lower, and even more preferably 500° C. or lower. On the other hand, in the case of performing firing in an inert atmosphere, the firing temperature is, for example, preferably 350° C. or higher. Meanwhile, the firing temperature is, for example, preferably 550° C. or lower, more preferably 500° C. or lower, and even more preferably 450° C. or lower.

It is also possible to produce the compound A by amorphizing the raw material powder through mechanical milling and then crystallizing the amorphized raw material powder through heat treatment. In this case, as long as the raw material powder can be sufficiently mixed and amorphized, the treatment apparatus and treatment conditions are not particularly limited. In particular, when a planetary ball mill is used, the container containing the raw material powder rotates and revolves at high speed, and thus high impact energy is generated between the raw material powder and balls, which are milling media that are placed in the container together with the raw material powder, enabling efficient and uniform amorphization of the raw material powder. The mechanical milling method may be either dry or wet.

The treatment conditions in mechanical milling may be set as appropriate according to a treatment apparatus used, and the treatment time may be set to, for example, from 0.1 to 100 hours. If the treatment time is within the aforementioned range, the raw material powder can be further efficiently and uniformly amorphized. The balls used as the milling media are preferably made of $ZrO_2$, $Al_2O_3$, $Si_3N_4$ (silicon nitride), or WC (tungsten carbide), and preferably have a ball diameter of approximately 0.2 to 10 mm.

The raw powder amorphized through mechanical milling is crystallized through heat treatment under the same firing conditions as described above to obtain the compound A. The raw material powder that has undergone mechanical milling is more uniformly mixed than the raw material powder obtained by ordinary milling and mixing, and thus the heat treatment temperature can be further reduced.

It is also possible to produce the compound A, using a liquid phase method with an organic solvent. In this case, sulfides and halides serving as raw materials of the compound A are dissolved in a solvent such as tetrahydrofuran or ethanol, and the compound A is precipitated using the solvent as a reaction field. Alternatively, the compound A synthesized in advance using another method is dissolved in a solvent such as ethanol and then re-precipitated to obtain the compound A. This sort of liquid phase method can produce the compound A in a shorter time and with less energy than other methods, and it is also relatively easy to reduce the particle size of the particles.

Once particles of the compound A are obtained in this manner, the particle size of these particles is preferably regulated to an appropriate size. The preferred particle size of the compound A may be similar to that described above, and thus a description thereof has been omitted.

Mixing Step

In this step, the compound A and the conductive material described above are mixed to obtain a composite material in which these materials are composited. As the conductive material for use together with the compound A, any material having electronic conductivity may be used without any particular limitation. Examples of the conductive material include various metal materials and conductive non-metal materials. These metal materials and conductive non-metal materials may be used alone or in combination.

Examples of the metal materials include various noble metal elements, for example, such as a gold (Au) element, a silver (Ag) element, a platinum (Pt) element, a palladium (Pd) element, a rhodium (Rh) element, an iridium (Ir) element, a ruthenium (Ru) element, and an osmium (Os) element. Examples thereof further include various transition metal elements, for example, such as a copper (Cu) element, an iron (Fe) element, and a tin (Sn) element. These metal elements may be used alone or in a combination of two or more. Examples of the conductive non-metal materials include carbon materials. The carbon materials may be, for example, graphite, acetylene black, carbon black, carbon nanofibers, carbon nanotubes, nanographene, fullerene nanowhiskers, or the like. These carbon materials may be used alone or in a combination of two or more. Of these carbon materials, the use of carbon black can further increase the initial capacity and the discharge rate characteristics of a battery using the composite material obtained by this production as the active material. From the viewpoint of making this advantage more remarkable, the carbon black is preferably furnace black, more preferably oil furnace black, and even more preferably Ketjen black.

The conductive material is in the form of particles, and its particle size D2 is, for example, preferably 1 nm or more, more preferably 10 nm or more, and even more preferably 20 nm or more. Meanwhile, D2 is, for example, preferably 500 nm or less, more preferably 300 nm or less, and even more preferably 200 nm or less. The particle size D2 of the conductive material can be determined as an average Feret's diameter (average particle size of 100 or more particles) obtained by directly observing the particles using a scanning electron microscope (SEM) or a transmission electron microscope (TEM).

For example, if the conductive material is in the form of fibers as in carbon nanotubes or carbon nanofibers as described above, the fiber diameter may be used instead of the particle size. A fiber diameter D3 is, for example, preferably 50 nm or more, more preferably 100 nm or more, and even more preferably 150 nm or more. Meanwhile, D3 is, for example, preferably 10000 nm or less, more preferably 5000 nm or less, and even more preferably 2000 nm or less.

From the viewpoint of successfully compositing the conductive material with the compound A, the size of the conductive material is preferably smaller than that of the compound A. Specifically, the value of D1/D2, which is a ratio of the particle size $D_1$ of the compound A to the particle size D2 of the conductive material, is, for example, preferably 2 or more, more preferably 5 or more, and even more preferably 10 or more. Meanwhile, the value of D1/D2 is, for example, preferably 1000 or less, more preferably 500 or less, and even more preferably from 10 to 100.

The size of the conductive material in the form of fibers is also preferably smaller than that of the compound A. Specifically, the value of D1/D3, which is a ratio of the particle size D1 of the compound A to a fiber diameter D3 of the conductive material, is, for example, preferably 1 or more, more preferably 2 or more, and even more preferably 5 or more. Meanwhile, the value of D1/D3 is, for example, preferably 1000 or less, more preferably 500 or less, and even more preferably 100 or less.

The compound A and the conductive material are composited, for example, by applying mechanical energy to particles of the compound A and particles of the conductive material. For this purpose, it is preferable to apply compression/impact forces or shear/friction forces to the compound A and the conductive material in a mixed state.

In the case of compositing the compound A and the conductive material by applying mechanical energy such as compression/impact forces or shear/friction forces to them in a mixed state, it is preferable to employ an apparatus used primarily when stirring, mixing, kneading, granulating, milling, dispersing, and/or surface modifying powders, for example. For example, a planetary ball mill, a ball mill, a jet mill, a bead mill, an agitation-type mill, a vibration mill, a hammer mill, a roller mill, an atomizer, or the like may be used. The main type of mechanical energy that can be applied using these apparatuses differs between apparatuses, and, for example, when using a planetary ball mill, the compound A and the conductive material can be composited by applying mainly compression/impact forces to them in a mixed state. The centrifugal acceleration obtained during apparatus rotation is not particularly limited as long as it is sufficient to composite the compound A and the conductive material, but the centrifugal acceleration is preferably 10 G or more, more preferably 15 G or more, and even more preferably 18 G or more, for example. Also, the centrifugal acceleration is preferably 40 G or less, more preferably 30 G or less, and even more preferably 25 G or less, for example. If the centrifugal acceleration is within the aforementioned range, the discharge capacity of a battery using the composite material obtained in the present invention as an active material can be further increased.

The compound A and the conductive material are mixed such that the conductive material is contained in an amount of, for example, preferably 1 part by mass or more, more preferably 2 parts by mass or more, and even more preferably 5 parts by mass or more, with respect to 100 parts by mass of the compound A. Meanwhile, the compound A and the conductive material are mixed such that the conductive material is contained in an amount of, for example, preferably 50 parts by mass or less, more preferably 20 parts by mass or less, and even more preferably 10 parts by mass or less, with respect to 100 parts by mass of the compound A. If the compound A and the conductive material are mixed within the aforementioned range, a battery using the composite material obtained by this production method as the active material will have a remarkably high discharge capacity.

It is preferable that the compositing of the compound A and the conductive material is performed such that the crystallinity of the compound A decreases. This configuration can further enhance the properties of the composite material obtained by this production method when used as an active material. The degree of decrease in the crystallinity of the compound A can be evaluated by the amorphous degree N represented by Formula (1) below.

$$\text{Amorphous degree } N(\%) = 100 \times (I_0 - I_r)/I_0 \tag{1}$$

In the formula, $I_0$ represents the intensity of the peak A. The peak A is a diffraction peak observed at the position $2\theta = 29.7° \pm 1.00°$ in an X-ray diffraction pattern obtained when the compound A is measured using an X-ray diffraction device using CuKα1 rays. Meanwhile, $I_r$ represents the intensity of the peak B. The peak B is a diffraction peak observed at the position $2\theta = 29.7° \pm 1.00°$ in an X-ray diffraction pattern obtained when the composite material is measured using an X-ray diffraction device using CuKα1 rays.

The amorphous degree N means that the closer its value is to 100%, the less crystalline the material is.

If there are two or more diffraction peaks observed at the position $2\theta = 29.7° \pm 1.00°$ in an X-ray diffraction pattern obtained when the compound A is measured, the diffraction peak with the highest peak intensity is taken as $I_0$. In a similar manner, if there are two or more diffraction peaks observed at the position $2\theta = 29.7° \pm 1.00°$ in an X-ray diffraction pattern when the composite material is measured, the diffraction peak with the highest peak intensity is taken as $I_r$. If the crystallinity of the composite material decreases, the half-value width of each diffraction peak in the X-ray diffraction pattern widens, which may cause a plurality of diffraction peaks to overlap, and, in that case, the plurality of overlapping diffraction peaks is regarded as one diffraction peak and taken as $I_r$.

The mixing step of mixing the compound A and the conductive material is performed such that the above-described amorphous degree N is, for example, preferably 97% or more, more preferably 98% or more, and even more preferably 99% or more. If the amorphous degree N is within the aforementioned range, the discharge capacity of a battery using the composite material obtained in the present invention as the active material can be increased.

A method for compositing the compound A and the conductive material by mixing them such that the amorphous degree N is greater than or equal to the above-mentioned value is, for example, to adjust the impact force within a predetermined range. The specific impact force is, for example, preferably 0.50 N or more, more preferably 0.70 N or more, and even more preferably 0.90 N or more. The impact force is a force generated when an object with mass collides with another object, and is expressed by Formula (2) below.

$$\text{Impact force } (F) = m \times G \tag{2}$$

In the formula, m is the weight (kg) of the object that collides with another object, and G is the acceleration (m/s²). In the case of a planetary ball mill, m is the total weight of balls that are placed in a container containing the compound A and the conductive material, and G is the centrifugal acceleration.

The method for successfully compositing the compound A and the conductive material by mixing them such that the impact force is greater than or equal to the above-mentioned value is, for example, to adjust their mixing conditions. For example, the conditions for mixing the compound A and the conductive material using a planetary ball mill include adjusting the rotational and/or revolution speed of the apparatus, the diameter, material, and number of balls, the mixing time, and the like.

When the compound A and the conductive material are composited such that the compound A is amorphized, lithium sulfide ($Li_2S$) may be generated from the elements contained in the compound A depending on the compositing conditions. The generation of lithium sulfide as a result of compositing is desirable because lithium sulfide functions as a positive electrode active material of batteries and enhances the discharge capacity of the batteries.

As described above, in the mixing step in which the compound A and the conductive material are composited such that the compound A is amorphized, whether or not the conductive material is amorphized is not particularly limited.

The thus obtained composite material is preferably particles constituted by a main portion containing particles of the compound A, and a conductive portion containing the conductive material that is dispersed on the surface of and/or inside the main portion and imparts electronic conductivity. In particular, the conductive portion is desirably dispersed uniformly and in intimate contact with the surface or the inside of the main portion because the conductive portion serves as an electron conduction path when lithium is desorbed and absorbed from the main portion.

As long as the effects of the present invention are achieved, the argyrodite formation ratio of the composite material obtained by this production method is not particularly limited. The argyrodite formation ratio is, for example, preferably 40 or less, more preferably 30 or less, even more preferably 10 or less, even more preferably 5 or less, and most preferably 0. The argyrodite formation ratio may be similar to that described in "Examples" below, and thus a description thereof has been omitted.

The "composite" state of the compound A and the conductive material according to the method of the present invention is preferably a state in which the conductive portion is dispersed on the surface of or inside the main portion integrally and inseparably in intimate contact with the main portion. The "composite" state is, for example, a state in which particles of the conductive material are inseparably dispersed on the surface of and/or inside particles of the compound A, or a state in which particles of the compound A constituting the main portion and particles of the conductive material constituting the conductive portion are bonded to each other through chemical reaction. The state in which particles of the conductive material are inseparably dispersed on the surface of or inside particles of the compound constituting the main portion means, for example, a state in which, when the composite material obtained by this production method is observed using a scanning electron microscope equipped with an energy dispersive X-ray spectrometer (SEM-EDS) to map the constituent elements (e.g., a sulfur element) of the compound A constituting the main portion and the constituent elements of the conductive material constituting the conductive portion, the constituent elements of the compound A constituting the main portion and the constituent elements of the conductive material constituting the conductive portion are present so as to overlap each other. Alternatively, this state means a state in which, when a cross-section of a positive electrode layer of a battery produced using the composite material obtained by this production method as an active material is observed, the constituent elements of the compound A constituting the main portion and the constituent elements of the conductive material constituting the conductive portion are present so as to overlap each other on the surface of or inside the active material. If the conductive material is a carbon material, the state in which the main portion and the conductive portion are composited to each other through chemical reaction can be seen based on the presence or absence of C—S bonding using Raman spectroscopy or photoelectron spectroscopy, for example.

If the composite material obtained by this production method is used as an active material, in the active material, electrons are smoothly transferred between the outside of the active material and the main portion via the conductive portion, and thus conductivity and lithium ion desorption/absorption function are acquired. Furthermore, since the compound A having a high lithium content and having an argyrodite-type crystal structure with high lithium ion conductivity is used for the main portion, a battery having the composite material obtained by this production method as an active material will exhibit a high discharge capacity. In particular, the composite material obtained by this production method is useful as a positive electrode active material of a lithium-ion battery.

If the composite material obtained by this production method is used as an active material, the active material can be mixed with an electrolyte, a conductive material, a binder, and the like to form an electrode material mixture. An electrode material mixture using the composite material obtained by this production method as a positive electrode active material can serve as a positive electrode material mixture for forming a positive electrode layer.

The electrolyte may be, for example, a solid electrolyte. The solid electrolyte preferably has ion conductivity such as lithium ion conductivity. Specific examples of the solid electrolyte include inorganic solid electrolytes such as sulfide solid electrolytes, oxide solid electrolytes, nitride solid electrolytes, and halide solid electrolytes, and organic polymer electrolytes such as polymer electrolytes. From the viewpoint of making the effects of the present invention more remarkable, the solid electrolyte is preferably a sulfide solid electrolyte. The sulfide solid electrolyte may be similar to those used in ordinary solid-state batteries. The sulfide solid electrolyte may contain Li and S and have lithium ion conductivity, for example.

The sulfide solid electrolyte may be any of a crystalline material, a glass ceramic, and glass. The sulfide solid electrolyte may have an argyrodite-type crystal structure. Examples of the sulfide solid electrolyte include compounds represented as $Li_2S$—$P_2S_5$, $Li_2S$—$P_2S_5$—$LiX$ ("X" indicates one or more halogen elements), $Li_2S$—$P_2S_5$—$P_2O_5$, $Li_2S$—$Li_3PO_4$—$P_2S_5$, $Li_3PS_4$, $Li_4P_2S_6$, $Li_{10}GeP_2S_{12}$, $Li_{3.25}Ge_{0.25}P_{0.75}S_4$, $Li_7P_3S_{11}$, $Li_{3.25}P_{0.95}S_4$, and $Li_aPS_bX_c$ ("X" indicates one or more halogen elements, a indicates a number of 3.0 to 9.0, b indicates a number of 3.5 to 6.0, and c indicates a number of 0.1 to 3.0). Other examples include sulfide solid electrolytes described in WO 2013/099834 and WO 2015/001818.

The active material contained in the electrode material mixture may be the composite material obtained by this production method alone, or may be a combination of the composite material and other active materials. Examples of the other active materials include known elemental sulfur and active materials containing sulfur. The proportion of the composite material in the electrode material mixture may be, for example, 20% by mass or more, 30% by mass or more, or 40% by mass or more. Meanwhile, the proportion may be, for example, 70% by mass or less, or 60% by mass or less.

A battery containing the composite material obtained by this production method as an active material preferably includes a positive electrode layer containing a positive electrode active material, a negative electrode layer containing a negative electrode active material, and a solid electrolyte layer containing a solid electrolyte, wherein the positive electrode active material is the composite material obtained by this production method. The battery can be produced, for example, by pressure molding three layers consisting of the positive electrode layer produced as described above, a solid electrolyte layer, and a negative electrode layer.

The battery having the composite material obtained by this production method as an active material is preferably a lithium-ion battery, and more preferably a lithium-sulfur battery. The battery may be a solid-state battery having a solid electrolyte layer, and, in particular, an all-solid-state battery. Furthermore, the battery having the composite material obtained by this production method as an active material may be either a primary battery or a secondary battery, but it is preferably a secondary battery, and more preferably a lithium secondary battery. The term "lithium secondary battery" is meant to broadly encompass secondary batteries that are charged and discharged by lithium ions moving between the positive and negative electrodes.

A solid-state battery includes a positive electrode layer, a negative electrode layer, and a solid electrolyte layer between the positive electrode layer and the negative electrode layer. The active material of the present invention is preferably contained in the positive electrode layer. The term "solid-state battery" is meant to encompass solid-state batteries that do not contain any liquid or gel-like substance as an electrolyte, as well as those that contain 50% by mass or less, 30% by mass or less, or 10% by mass or less of liquid or gel-like substance as an electrolyte, for example.

As for the foregoing embodiment, the present invention further discloses a method for producing a composite material described below.

[1]

A method for producing a composite material, comprising:

a preparation step of preparing a compound A containing a lithium (Li) element, a sulfur(S) element and an M element and containing a crystal phase with an argyrodite-type crystal structure, wherein M comprises at least one selected from the group consisting of a phosphorus (P) element, a germanium (Ge) element, an antimony (Sb) element, a silicon (Si) element, a tin (Sn) element, an aluminum (Al) element, a titanium (Ti) element, an iron (Fe) element, a nickel (Ni) element, a cobalt (Co) element, and a manganese (Mn) element; and a mixing step of mixing the compound A and a conductive material to obtain a composite material in which the compound A and a conductive material are composited; wherein the mixing step is performed in such a manner that an amorphous degree N obtained by Formula (1) below is 97% or more:

$$\text{Amorphous degree } N(\%) = 100 \times (I_0 - I_t)/I_0 \qquad (1)$$

wherein $I_0$ represents an intensity of a peak A which is a diffraction peak observed at a position $2\theta=29.7°\pm1.00°$ in an X-ray diffraction pattern obtained when the compound A is measured using an X-ray diffraction device using CuKα1 rays, and $I_t$ represents an intensity of a peak B which is a diffraction peak observed at a position $2\theta=29.7°\pm1.00°$ in an X-ray diffraction pattern obtained when the composite material is measured using an X-ray diffraction device using CuKα1 rays.

[2]

The production method as set forth in [1], wherein the M element contained in the compound A contains at least a phosphorus (P) element.

[3]

The production method as set forth in [1] or [2], wherein an atomic ratio of a halogen (X) element to the phosphorus (P) element contained in the compound A is less than 1.0.

[4]

The production method as set forth in any one of [1] to [3], wherein an atomic ratio of the lithium (Li) element to the phosphorus (P) element contained in the compound A is from 5.0 to 9.0.

[5]

The production method as set forth in any one of [1] to [4], wherein the conductive material is a carbon material or a metal material.

[6]

A composite material produced by the method as set forth in any one of [1] to [5].

EXAMPLES

Hereinafter, the present invention will be described in more detail by way of the following examples. However, the scope of the invention is not limited to these examples. Unless otherwise specified, "%" and "parts" mean "% by mass" and "parts by mass" respectively.

Example 1

(1) Preparation Step

The compound A and the conductive material having the compositions shown in Table 1 below were prepared.

(2) Mixing Step

The compound A and the conductive material were mixed in the amounts used shown in Table 1. A planetary ball mill (P-7 manufactured by Fritsch) was used for mixing. The balls used were made of zirconia with a diameter of 5 mm. Mixing was performed at a rotational speed of 500 rpm for 10 hours. The impact force applied at this time was as shown in Table 1. In this manner, a composite material in which the compound A and the conductive material were composited was obtained. The obtained composite material was crushed in a mortar and sieved with a 53-μm aperture sieve to obtain particles with a particle size $D_{50}$ of 6.6 μm.

All of the above operations were performed in a glove box purged with well-dried Ar gas (with a dew point of −60° C. or lower).

Example 2

The materials shown in Table 1 were used as the compound A and the conductive material. A composite material was obtained in the same way to that of Example 1, except for this aspect. In this example, "X/P atomic ratio" shown in Table 1 represents the ratio of the number of atoms of the X (halogen) element to the number of atoms of the phosphorus element. Furthermore, "Li/P atomic ratio" represents the ratio of the number of atoms of the Li element to the number of atoms of the phosphorus element.

Examples 3 and 4

The material shown in Table 1 was used as the compound A. A composite material was obtained in the same way to that of Example 1, except for this aspect.

Example 5

The material shown in Table 1 was used as the compound A. Mixing using a planetary ball mill with zirconia balls with a diameter of 10 mm was performed at a rotational speed of 600 rpm for 10 hours. The impact force applied at this time was as shown in Table 1. A composite material was obtained in the same way to that of Example 1, except for these aspects.

Comparative Example 1

The material shown in Table 1 was used as the compound A. Mixing using a planetary ball mill with zirconia balls with a diameter of 10 mm was performed at a rotational speed of 600 rpm for 10 hours. The impact force applied at this time was as shown in Table 1. A composite material was obtained in the same way to that of Example 1, except for these aspects.

Comparative Example 2

The materials shown in Table 1 were used as the compound A and the conductive material. Mixing using a planetary ball mill was performed at a rotational speed of 300 rpm for 1 hour. The impact force applied at this time was as shown in Table 1. A composite material was obtained in the same way to that of Example 1, except for these aspects.

Reference Example 1

The materials shown in Table 1 were used as the compound A and the conductive material. A composite material was obtained in the same way to that of Example 1, except for this aspect.

Evaluation

Figure 1:
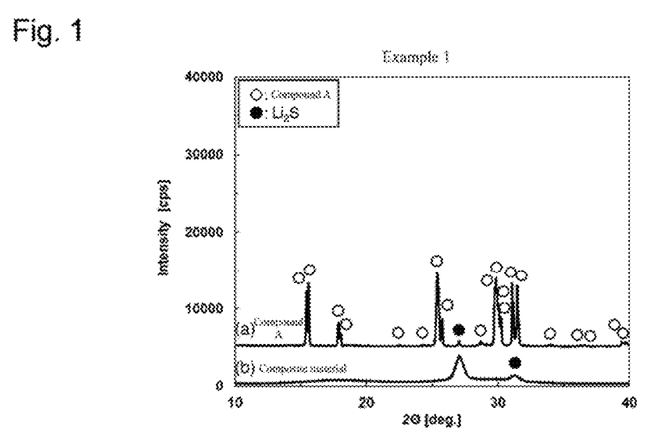
FIG. 1 shows X-ray diffraction patterns of a composite material of a compound A and a conductive material used in Example 1.
Figure 2:
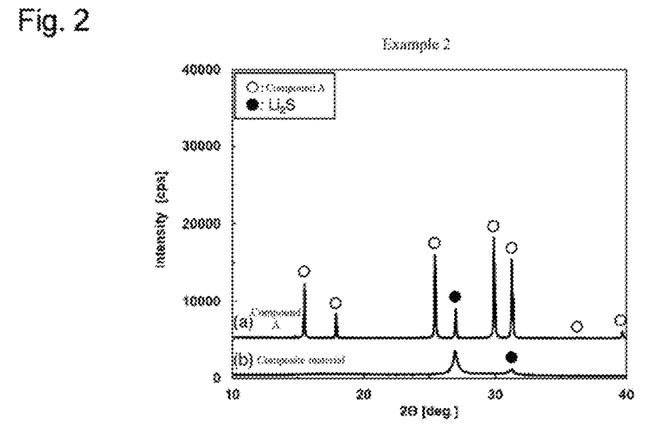
FIG. 2 shows X-ray diffraction patterns of a composite material of a compound A and a conductive material used in Example 2.
Figure 3:
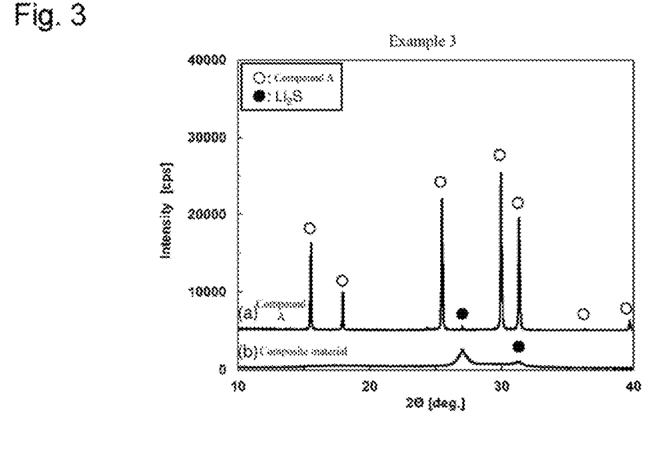
FIG. 3 shows X-ray diffraction patterns of a composite material of a compound A and a conductive material used in Example 3.
Figure 4:
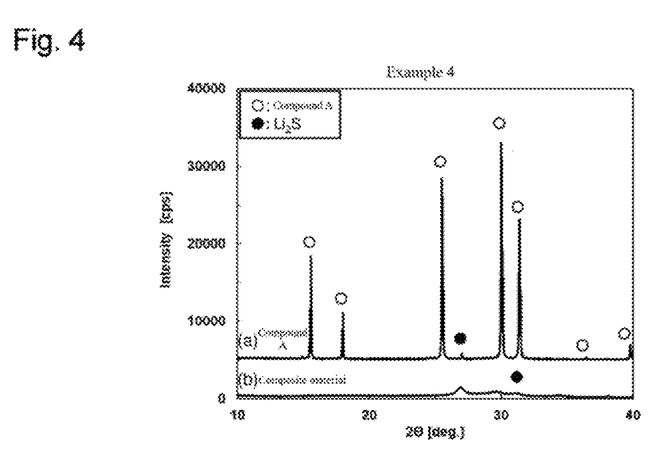
FIG. 4 shows X-ray diffraction patterns of a composite material of a compound A and a conductive material used in Example 4.
Figure 5:
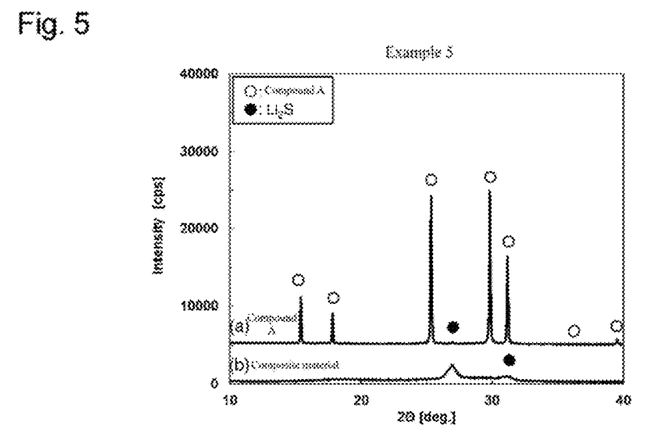
FIG. 5 shows X-ray diffraction patterns of a composite material of a compound A and a conductive material used in Example 5.
Figure 6:
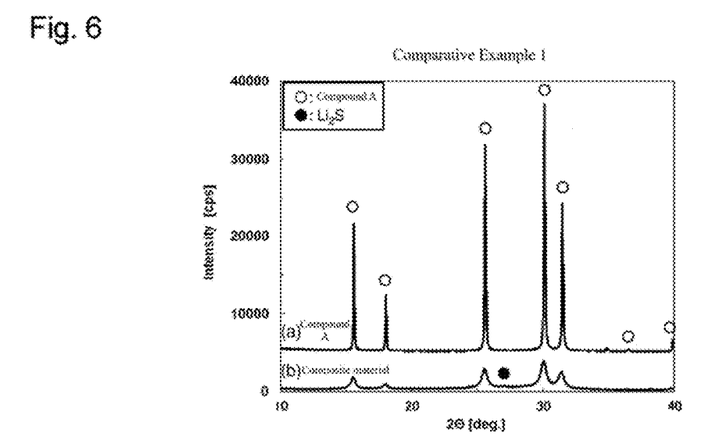
FIG. 6 shows X-ray diffraction patterns of a composite material of a compound A and a conductive material used in Comparative Example 1.
Figure 7:
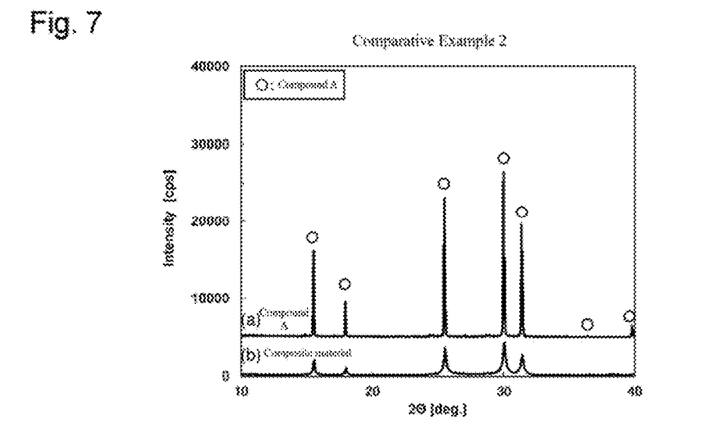
FIG. 7 shows X-ray diffraction patterns of a composite material of a compound A and a conductive material used in Comparative Example 2.
Figure 8:
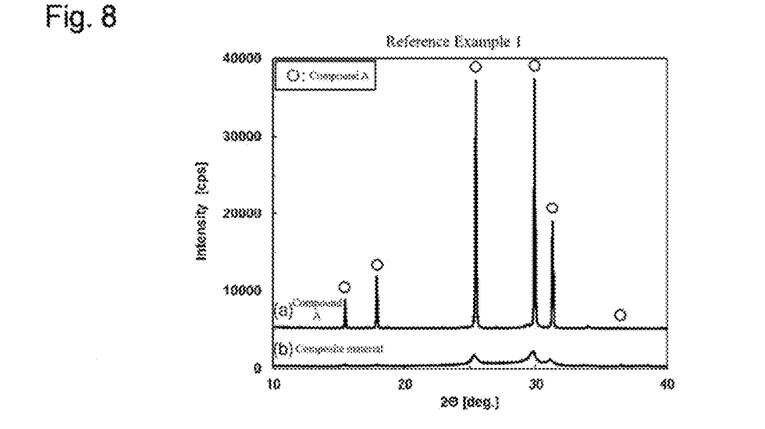
FIG. 8 shows X-ray diffraction patterns of a composite material of a compound A and a conductive material used in Reference Example 1.

XRD measurements were performed on the compounds A used in the examples, the comparative examples, and the reference example and the composite materials produced therein, $I_0$ and $I_1$, which are the intensities of peaks A and B, were measured, and the amorphous degree N was calculated. Table 1 shows results. The XRD charts are shown in FIGS. 1 to 8. The conditions for the XRD measurements were as follows.

XRD Measurement

The composite materials obtained in the examples, the comparative examples, and the reference example were each filled into an airtight holder of a non-air-exposure type in a glove box purged with well-dried Ar gas (with a dew point of −60° C. or lower), and subjected to XRD measurement. The measurement conditions were as follows.

Device name: fully automatic multi-purpose X-ray diffractometer SmartLab SE (manufactured by Rigaku)
Radiation source: CuKα1
Tube voltage: 40 kV
Tube current: 50 mA
Measuring method: concentration method (reflection method)
Optical system: multilayer mirror divergent beam method (CBO-α)
Detector: one-dimensional semiconductor detector
Incident solar slit: solar slit 2.5°
Length limiting slit: 10 mm
Light-receiving solar slit: 2.5°
Incident slit: 1/6°
Light-receiving slit: 2 mm (open)
Measurement range: 2θ=10 to 120°
Step width: 0.02°
Scanning speed: 1.0°/min The argyrodite formation ratio was also measured for the composite materials produced in the examples, the comparative examples, and the reference example, using the following method. Table 1 shows results.

Argyrodite Formation Ratio

In the X-ray diffraction pattern of the composite material, the intensity of a diffraction peak observed at 29.62°±1.00° is taken as $I_a$ in the case in which the compound A has a cubic argyrodite-type crystal structure, and the intensity of a diffraction peak observed at 29.77°±1.00° is taken as $I_a$ in the case in which the compound A has an orthorhombic argyrodite-type crystal structure. Also, the intensity of a diffraction peak of lithium sulfide observed at a position 2θ=27.00°±1.00° is taken as $I_b$. The composite material can be evaluated by the argyrodite formation ratio expressed by Formula (3) below.

$$\text{Argyrodite formation ratio (\%)} = 100 \times I_a / (I_a + I_b) \quad (3)$$

Although impurity phases other than the compound A and lithium sulfide may be observed in the composite material, the formation ratio of the impurity phases may not be considered in the argyrodite formation ratio because the formation ratio thereof is small.

Solid-state battery cells were produced using the composite materials produced in the examples, the comparative examples, and the reference example as the positive electrode active material, and their initial discharge capacities were measured using the following method. Table 1 shows results.

Production of All-Solid-State Battery Cell

All-solid-state batteries were produced using the composite materials produced in the examples, the comparative examples, and the reference example as the positive electrode active material, $Li_{5.4}PS_{4.4}Cl_{0.8}Br_{0.8}$ having an argyrodite-type crystal structure as the solid electrolyte powder for the positive electrode layer and the solid electrolyte layer, and In—Li metal as the negative electrode active material for the negative electrode layer.

Preparation of Positive Electrode Material Mixture

The positive electrode material mixture powder for the positive electrode layer was prepared by mixing the composite material powders obtained in the examples and the comparative examples and the solid electrolyte powder at a mass ratio of 60:40 in a mortar.

Preparation of All-Solid-State Battery Cell

The bottom opening of a cylindrical polypropylene container (with an opening diameter of 10.5 mm and a height of 18 mm) that was open at the top and bottom was closed with a negative electrode (made of SUS), the solid electrolyte powder was placed thereon, the container was closed with a positive electrode (made of SUS), and then uniaxial pressing was performed at 200 MPa to form a solid electrolyte layer. Next, the positive electrode was once removed, a positive electrode material mixture powder was placed on the solid electrolyte layer, the container was closed again with the positive electrode, and then uniaxial pressing was performed at 560 MPa to stack the positive electrode layer and the solid electrolyte layer. Subsequently, the cylinder was inverted, the negative electrode was once removed, Li foil was placed on the solid electrolyte layer, the container was closed again with the negative electrode, and finally the positive and negative electrodes were clamped using a C-clamp at a load of 6 N·m to produce an all-solid-state battery cell in which a positive electrode layer, a solid electrolyte layer, and a negative electrode layer were stacked. The positive electrode layer had a thickness of about 40 μm, the solid electrolyte layer had a thickness of about 600 μm, and the negative electrode layer had a thickness of about 400 μm. The all-solid-state battery cell was produced in a glove box purged with argon gas with a dew point of −60° C. The produced all-solid-state battery was connected to a charge-discharge measurement device in an environmental test chamber kept at 25° C., and the battery properties were measured. A current of 2.0 mA during charge and discharge was taken as 1 C rate.

Initial Capacity

Figure 9:
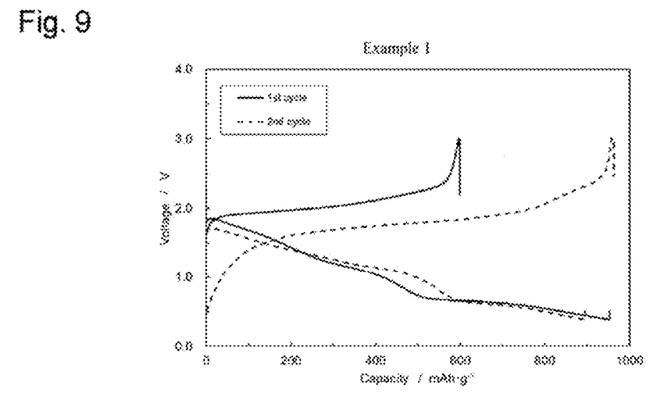
FIG. 9 shows charge-discharge curves of a battery using a positive electrode active material produced in Example 1.
Figure 10:
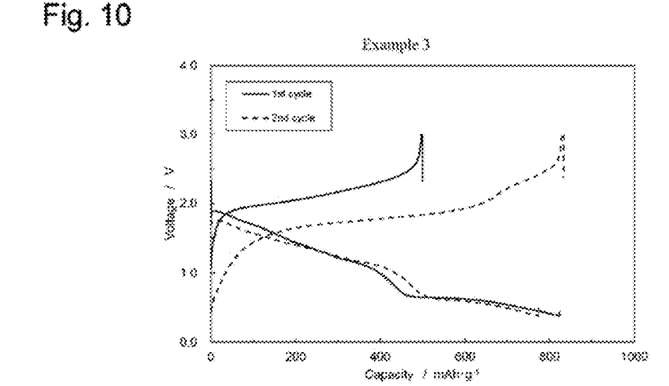
FIG. 10 shows charge-discharge curves of a battery using a positive electrode active material produced in Example 3.
Figure 11:
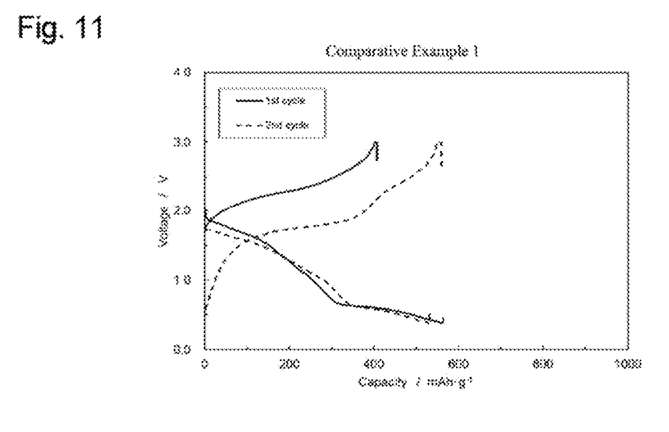
FIG. 11 shows charge-discharge curves of a battery using a positive electrode active material produced in Comparative Example 1.
Figure 12:
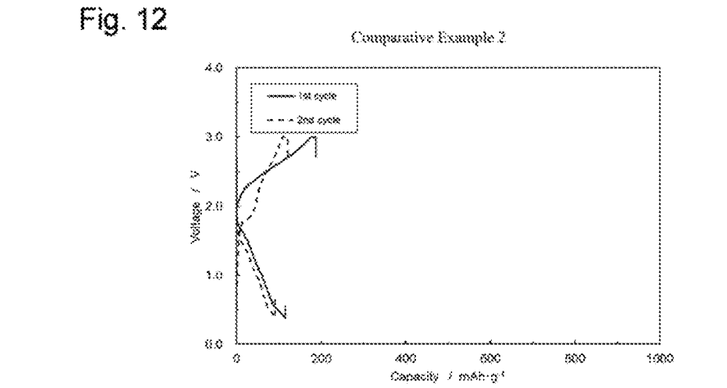
FIG. 12 shows charge-discharge curves of a battery using a positive electrode active material produced in Comparative Example 2.
Figure 13:
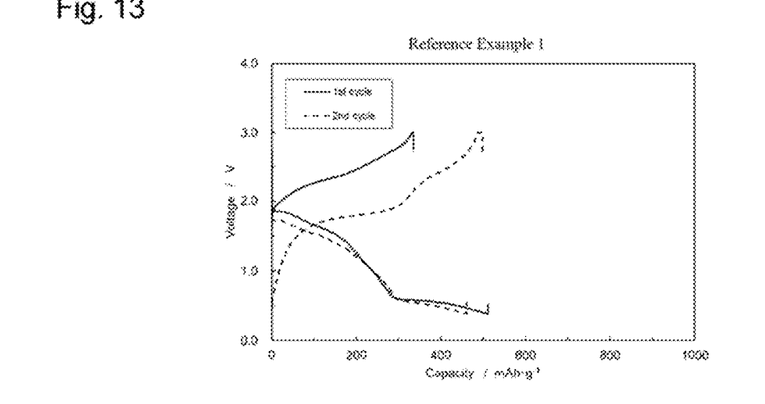
FIG. 13 shows charge-discharge curves of a battery using a positive electrode active material produced in Reference Example 1.

In the initial charge and discharge (first cycle), the battery was charged at 0.03 C to 3.0 V using the CC-CV method and discharged at 0.03 C to 0.38 V using the CC method, in order to allow lithium ions contained in the positive electrode active material to be effectively desorbed and absorbed. In the second cycle, the battery was charged at 0.1 C to 3.0 V using the CC-CV method and discharged at 0.1 C to 0.38 V using the CC method. The charge and discharge capacity in the second cycle were taken as the initial charge and discharge capacity. FIGS. 9 to 13 show the measurement results of Examples 1 and 3, Comparative Examples 1 and 2, and Reference Example 1.

TABLE 1

| | | Example | | | | |
|---|---|---|---|---|---|---|
| | | 1 | 2 | 3 | 4 | 5 |
| Compound A | Composition | $Li_7PS_6$ | $Li_{7.1}P_{0.9}Fe_{0.1}S_{5.8}Cl_{0.2}$ | $Li_{6.6}PS_{5.6}Cl_{0.4}$ | $Li_{6.2}PS_{5.2}Cl_{0.8}$ | $Li_{6.6}PS_{5.6}Br_{0.4}$ |
| | X/P atomic ratio | 0 | 0.2 | 0.4 | 0.8 | 0.4 |
| | Li/P atomic ratio | 7.0 | 7.9 | 6.6 | 6.2 | 6.6 |
| | Average particle size D1 [μm] | 7.8 | 5.4 | 4.3 | 3.9 | 4.4 |
| | Amount of use [parts] | 83.3 | 83.3 | 83.3 | 83.3 | 83.3 |
| Conductive material | Type | KB | VGCF | KB | KB | KB |
| | Average particle size D2 [nm] | 40 | 150 (fiber diameter) | 40 | 40 | 40 |
| | Amount of use [parts] | 16.7 | 16.7 | 16.7 | 16.7 | 16.7 |
| Impact force [N] | | 0.953 | 0.953 | 0.953 | 0.953 | 1.373 |
| Amorphous degree N [%] | | 100.0 | 100.0 | 100.0 | 99.0 | 100.0 |
| Argyrodite formation ratio | | 0.0 | 0.0 | 0.0 | 29.2 | 0.0 |
| Initial discharge capacity [mAh/g] | | 894.6 | 908.9 | 773.9 | 712.0 | 634.8 |

| | | Comparative Example | | Reference Example |
|---|---|---|---|---|
| | | 1 | 2 | 1 |
| Compound A | Composition | $Li_{5.8}PS_{4.8}Cl_{1.2}$ | $Li_6PS_5Cl$ | $Li_{5.4}PS_{4.4}Cl_{0.8}Br_{0.8}$ |
| | X/P atomic ratio | 1.2 | 1.0 | 1.6 |
| | Li/P atomic ratio | 5.8 | 6.0 | 5.4 |
| | Average particle size D1 [μm] | 3.8 | 3.6 | 2.8 |
| | Amount of use [parts] | 83.3 | 83.3 | 83.3 |
| Conductive material | Type | KB | MWCNT | VGCF |
| | Average particle size D2 [nm] | 40 | 500-2,000 (fiber diameter) | 150 (fiber diameter) |
| | Amount of use [parts] | 16.7 | 16.7 | 16.7 |
| Impact force [N] | | 1.373 | 0.343 | 0.953 |
| Amorphous degree N [%] | | 95.2 | 82.9 | 89.2 |
| Argyrodite formation ratio | | 93.3 | 100.0 | 100.0 |
| Initial discharge capacity [mAh/g] | | 535.6 | 91.3 | 469.0 |

KB: Ketjen black (registered trademark) EC300J (particle size D50: 40 nm) manufactured by Lion Specialty Chemicals Co., Ltd.
VGCF: Carbon nanotube VGCF (registered trademark) -H (fiber diameter: 150 nm) manufactured by Showa Denko K.K.
MWCNT: Multi-layered carbon nanotube (fiber diameter: 500-2,000 nm)

As is clear from the results shown in Table 1, it was confirmed that batteries using the composite materials produced in the examples as the positive electrode active material have high initial discharge capacities.

INDUSTRIAL APPLICABILITY

As described above in detail, the present invention provides a method that can preferably produce a material capable of enhancing the performance of lithium ion batteries.

The invention claimed is:

1. A method for producing a composite material, comprising:
   a preparation step of preparing a compound A containing a lithium (Li) element, a sulfur(S) element and an M element and containing a crystal phase with an argyrodite-type crystal structure, wherein M comprises at least one selected from the group consisting of a phosphorus (P) element, a germanium (Ge) element, an antimony (Sb) element, a silicon (Si) element, a tin (Sn) element, an aluminum (Al) element, a titanium (Ti) element, an iron (Fe) element, a nickel (Ni) element, a cobalt (Co) element, and a manganese (Mn) element; and
   a mixing step of mixing the compound A and a conductive material to obtain a composite material in which the compound A and the conductive material are composited;
   wherein the mixing step is performed in such a manner that an amorphous degree N obtained by Formula (1) below is 97% or more:

$$\text{Amorphous degree } N(\%) = 100 \times (I_0 - I_t)/I_0 \tag{1}$$

wherein $I_0$ represents an intensity of a peak A which is a diffraction peak observed at a position 2θ=29.7°±1.00° in an X-ray diffraction pattern obtained when the compound A is measured using an X-ray diffraction device using CuKα1 rays, and $I_t$ represents an intensity of a peak B which is a diffraction peak observed at a position 2θ=29.7°±1.00° in an X-ray diffraction pattern obtained when the composite material is measured using an X-ray diffraction device using CuKα1 rays.

2. The method according to claim 1, wherein the M element contained in the compound A contains at least a phosphorus (P) element.

3. The method according to claim 1, wherein an atomic ratio of a halogen (X) element to the phosphorus (P) element contained in the compound A is less than 1.0.

4. The method according to claim 1, wherein an atomic ratio of the lithium (Li) element to the phosphorus (P) element contained in the compound A is from 5.0 to 9.0.

5. The method according to claim 1, wherein the conductive material is a carbon material or a metal material.

* * * * *